J. REBOURS.
GASOLENE AND OIL SYSTEM FOR AUTOMOBILES.
APPLICATION FILED NOV. 16, 1918.
1,358,783.   Patented Nov. 16, 1920.
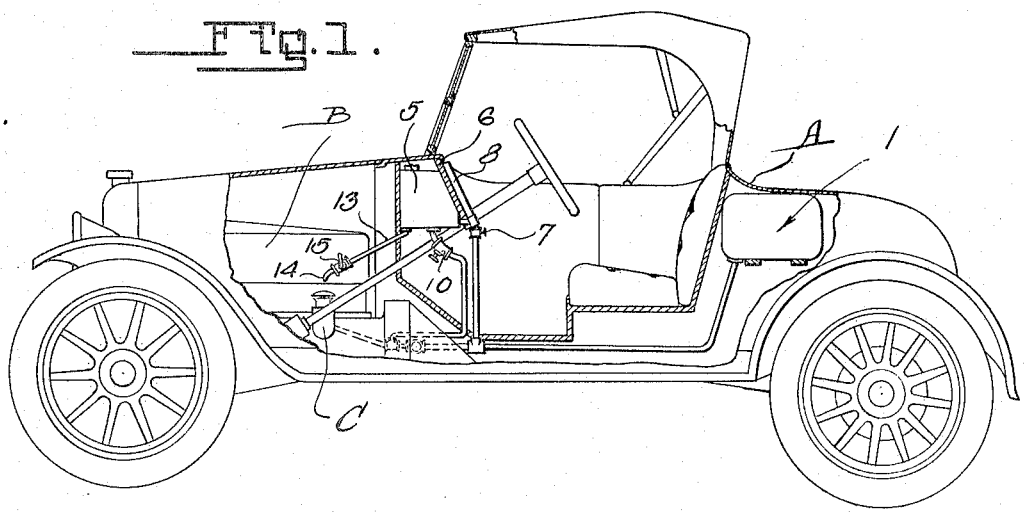
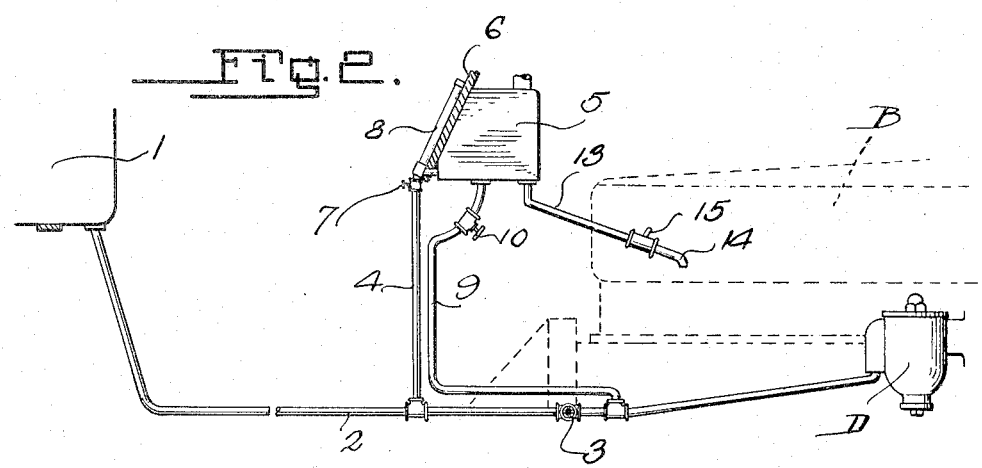
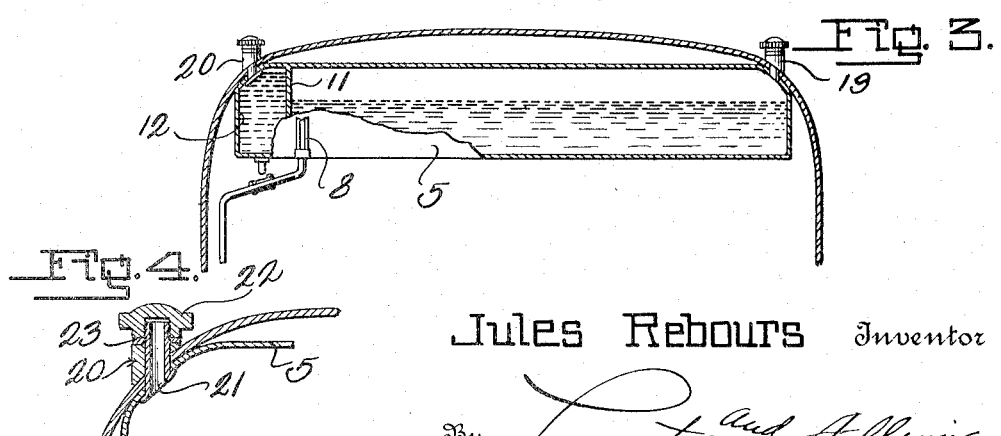
Jules Rebours  Inventor

UNITED STATES PATENT OFFICE.

JULES REBOURS, OF GRAND RAPIDS, MICHIGAN.

GASOLENE AND OIL SYSTEM FOR AUTOMOBILES.

1,358,783.                Specification of Letters Patent.    Patented Nov. 16, 1920.

Application filed November 16, 1918. Serial No. 262,866.

*To all whom it may concern:*

Be it known that I, JULES REBOURS, a citizen of the United States, residing at Grand Rapids, in the county of Kent and State of Michigan, have invented certain new and useful Improvements in Gasolene and Oil Systems for Automobiles, of which the following is a specification.

This invention relates to an emergency gasolene and oil system for automobiles, and an object of the invention is to provide an auxiliary gasolene or fuel retaining tank which is carried at the forward end of the motor vehicle and is supplied, by gravity action, from the main gasolene supply tank of the automobile, so as to maintain a supply of gasolene at the forward end of the machine for feeding to the engine or motor of the motor vehicle when climbing a steep hill or at such other times that the feed of the gasolene or fuel from the ordinary rear supply tank is not sufficient to operate the engine.

The subject matter of the present application is a continuation in part of the application for automobile body filed November 27, 1916, Serial Number 133,591, and an object of the invention is to provide, in connection with the emergency gasolene tank, an emergency oil reservoir or tank which is formed within the main body of the tank construction of the auxiliary or emergency fuel tank, and from which a supply pipe leads for discharging the contents of the oil reservoir into the engine sump through the breather tube thereof.

Other objects of the invention will appear in the following detailed description, taken in connection with the accompanying drawing, forming a part of this specification, and in which drawing:

Figure 1 is a side elevation of a motor vehicle, showing parts thereof in section to illustrate the improved emergency system.

Fig. 2 is a side elevation of the emergency system looking from the opposite side of that exposed in Fig. 1.

Fig. 3 is a cross section through a part of the cowl of the motor vehicle showing the auxiliary fuel tank and emergency oil reservoir in section, and Fig. 4 is a detailed section view through the tank illustrating the manner of connecting a filler plug to the reservoir.

Referring more particularly to the drawing, A indicates an automobile of any desired shape or type, which has the usual engine or motor B including the breather tube C. The improved emergency oil and fuel system is shown applied to the automobile and it includes the ordinary gasolene supply tank 1 which is carried at the rear end of the motor vehicle and has communication through a supply pipe 2 with the carbureter D of the engine B for supplying gasolene or analogous volatile liquid to the carbureter. The pipe 2 has a valve 3 interposed therein between the tank 1 and carbureter D to permit the cut-off of the flow of gasolene from the tank to the carbureter if desired. A branch pipe 4 communicates with the pipe 2 between the tank 1 and valve 3 and its upper delivery end has communication with the interior of the auxiliary or emergency reservoir or tank 5 which is positioned near the forward end of the automobile as clearly shown in Fig. 1 of the drawings, it being preferably positioned directly in front of the instrument board indicated at 6. The gasolene from the tank 1 will flow, through the pipe 4 and into the tank 5, until the gasolene in the tank 5 maintains an equal level with the gasolene in the tank 1 and if it is so desired, the valve 7 may then be closed, for cutting off the supply of gasolene in to the tank 5. A gage 8 is associated with the tank 5, being connected to the pipe 4 for indicating the quantity of liquid within the main body or compartment of this auxiliary tank. An outlet pipe 9 communicates with the bottom of the main compartment of the tank 5 and with the pipe 2 between the valve 3 and carbureter D for allowing the liquids or gasolene to flow from the auxiliary or emergency tank to the carbureter. A valve 10 is interposed in the pipe 9 near the tank 5 for cutting off the flow of the gasolene through the pipe 9.

The tank 5 has a partition 11 therein near one end, forming a reservoir or receptacle 12 for lubricating oil, and an outlet pipe 13 leads from the reservoir 12, having its outlet end 14 positioned above and in alinement with the breather cap C of the engine B, for allowing the oil from this emergency reservoir to flow through the breather cap or tube into the sump of the engine in case the oil supply of the engine becomes dangerously low. A valve 15 is interposed in the pipe 13 for controlling the passage of oil from the reservoir 12 into the breather tube C.

Filler plugs 19 and 20 are carried by the cowl of the automobile A and communicate respectively with the gasolene containing compartment of the tank 5 and the oil reservoir 12. These filler plugs are of the ordinary construction, comprising a tube 21 which extends through the cowl and the tank 5 being adapted to receive therein the outlet of the spout of a funnel and these tubes 21 have their outer ends threaded for receiving a closure cap 22. A gasket 23 may be interposed between the closure cap 22 and the collar which surrounds the tube 21 for forming a fluid tight joint between the cap and tube. These filler plugs 19 and 20 are positioned one upon each side of the cowl of the automobile so that the respective reservoirs or compartments with which they communicate may be filled from the exterior of the machine if desired, thereby providing for the filling of the tank 1 through the auxiliary tank 5, if desired, by closing the valves 3 and 10 and opening the valve 7 or to permit the filling of the emergency or auxiliary tank independent of the gravity action for filling the same from the tank 1.

It will be readily apparent, from the foregoing description and the drawings, that when the tank 1 is filled, the gasolene will flow by gravity, through the pipes 2 and 4, when the valve 7 is opened, into the tank 5 where it will assume the same level as is maintained in the tank 1 and after this level has been provided, the valves 7 and 3 may be closed to prevent the gasolene from flowing from the auxiliary tank 5 back to the tank 1 in case the gasolene level in the latter tank falls below the level in the tank 5, and in cases where the automobile is going up a steep incline or grade, so as to prevent the proper feeding of the gasolene from the tank 1, the valve 10 may be opened to allow the gasolene to feed from the tank 5 to the carbureter D. In cases where the supply of gasolene from the tank 1 is exhausted and it is desired to use the gasolene from the auxiliary or emergency tank, the valve 3 is closed to prevent the gasolene from flowing backwardly through the pipe 2 into the tank 1, and the valve 10 is opened to allow the gasolene to flow through the pipe 9 and to the carbureter D. If the valve 7 is left open, the gage 8 will indicate the quantity of gasolene in the tanks 1 and 5, and in cases where the valve 7, is closed, the gage will indicate only the quantity of gasolene in the tank 5.

Changes in details may be made without departing from the spirit of this invention, but;

I claim:

1. In a motor vehicle, the combination, of a body, a carbureter, a rear fuel tank arranged in said body, a front auxiliary fuel tank carried by the body and arranged in substantially the same horizontal plane with said rear fuel tank, a pipe communicating with said rear tank and communicating with the carbureter, a branch pipe connected to said first mentioned pipe and having communication with said front auxiliary fuel tank whereby the fuel will maintain equal levels in both tanks, a valve in said branch pipe near said auxiliary supply tank, and a second valve in the first mentioned pipe, between the communication in the first mentioned pipe with the branch pipe and the carbureter, an outlet pipe having communication with said front auxiliary fuel tank and with the first mentioned pipe beyond the valve therein, and a valve in said outlet pipe adapted to be normally closed.

2. In a motor vehicle, the combination of a body, an internal combustion engine including a crank case having a breather pipe and a carbureter, of a supply tank having a fuel compartment therein, and a lubricating oil compartment, a pipe connecting the fuel compartment with the carbureter, and a pipe connecting the lubricating oil compartment with the breather pipe.

JULES REBOURS.